(12) United States Patent
Cruellas Alvarez et al.

(10) Patent No.: US 8,421,303 B2
(45) Date of Patent: Apr. 16, 2013

(54) SYSTEM FOR SECURING PERMANENT MAGNETS

(75) Inventors: Francesc Cruellas Alvarez, Tiana (ES); Ivan Flotats Giralt, Barcelona (ES)

(73) Assignee: Infranor Holding S.A., Yverdon-les-Bains (CH)

( * ) Notice: Subject to any disclaimer, the term of this patent is extended or adjusted under 35 U.S.C. 154(b) by 1048 days.

(21) Appl. No.: 11/409,442

(22) Filed: Apr. 21, 2006

(65) Prior Publication Data
US 2006/0238056 A1 Oct. 26, 2006

(30) Foreign Application Priority Data

Apr. 22, 2005 (EP) .................................... 05008828

(51) Int. Cl.
*H02K 1/22* (2006.01)
*H02K 3/48* (2006.01)
(52) U.S. Cl.
USPC ...................... 310/268; 310/271; 310/156.32
(58) Field of Classification Search .................. 310/268, 310/271, 156.01, 156.32–156.37
See application file for complete search history.

(56) References Cited

U.S. PATENT DOCUMENTS

| | | | | |
|---|---|---|---|---|
| 2,767,368 A * | 10/1956 | Kober | ............................ | 322/57 |
| 3,953,752 A | 4/1976 | Bannon | .................... | 310/156.22 |
| 4,549,341 A | 10/1985 | Kasabian | ........................ | 29/598 |
| 4,629,920 A * | 12/1986 | Hermann | ................. | 310/156.35 |
| 4,855,630 A * | 8/1989 | Cole | ........................ | 310/156.28 |
| 6,603,232 B2 * | 8/2003 | Van Dine et al. | ......... | 310/156.01 |
| 6,812,609 B2 * | 11/2004 | Anwander | ............... | 310/156.55 |
| 2004/0124719 A1 | 7/2004 | Aoshima et al. | | |

FOREIGN PATENT DOCUMENTS

| | | |
|---|---|---|
| GB | 1 477 878 | 6/1977 |
| GB | 14477878 | 6/1977 |
| JP | 50-49602 | 2/1975 |
| JP | 53-116410 | 10/1978 |
| JP | 62-044095 A | 2/1987 |
| JP | 2-119545 | 5/1990 |
| JP | 02-119545 A | 5/1990 |
| JP | 6-54472 | 2/1994 |

(Continued)

OTHER PUBLICATIONS

Office action from corresponding Japanese application 2006-119782 dated Nov. 1, 2011 with English translation.

(Continued)

*Primary Examiner* — Tran Nguyen
*Assistant Examiner* — Alex W Mok
(74) *Attorney, Agent, or Firm* — Frommer Lawrence & Haug LLP; Ronald R. Santucci

(57) ABSTRACT

The present invention relates to an alternating-current-synchronous-servomotor having a disk-shaped rotor (55, 56) which is located between two stator halves. The rotor comprises an even number of flat permanent magnets pieces (56) having magnet field lines extending parallel to the shaft of the rotor. The permanent magnet pieces (56) form an annular like series including interstices extending around a hub (55) supported on the shaft. The magnet pieces are made of a magnetically non-conductive material and have flat sides acting as magnetic pole surfaces (N, S) which extend in parallel planes to which the axis of the shaft extend perpendicularly. The permanent magnet pieces (56) have limiting surfaces located radially inwards, which are supported each on one of peripheral planes of the hub (55). Said peripheral planes and said limiting surfaces comprise cooperating means (57, 58, 59, 60) for fixing said magnet pieces (54) on said hub (55).

10 Claims, 5 Drawing Sheets

FOREIGN PATENT DOCUMENTS

| | | |
|---|---|---|
| JP | 06-054472 A | 2/1994 |
| JP | 8-168227 A | 6/1996 |
| JP | 2001-78376 | 3/2001 |
| JP | 2001346345 A * | 12/2001 |
| JP | 2004-208478 A | 7/2004 |

OTHER PUBLICATIONS

Office action from corresponding Japanese application 2006-119782 dated Dec. 11, 2012 with English translation.

* cited by examiner

Prior Art

Prior Art

SYSTEM FOR SECURING PERMANENT MAGNETS

This application claims priority benefits from European Patent Application No. (EP) 05008828.5 filed Apr. 22, 2005.

The present invention relates to alternating current synchronous servomotors of the kind at which a disk-shaped rotor is located between two stator halves of which each is provided with a bearing for a shaft supporting the rotor and comprise each a magnet iron part having a plurality of radial grooves and an electrical coil having leads inserted in the radial grooves which rotor comprises an even number of flat permanent magnet parts having magnet field lines extending parallel to the shaft, which permanent magnet parts form an annular like series including interstices extending around a hub supported on the shaft and of a magnetically not conductive material and have that sides acting as magnetic pole surfaces which extend in parallel planes to which the axis of the shaft extend, perpendicularly and are serially alternating north and south poles, and whereby the interstices between adjacent permanent magnet parts diverge radially towards the outside.

A motor with a rotor of the described design is known e.g. from a Japanese patent application according to the publication JP-A 53-116 410 (1978). It, however, encompasses obviously a motor having a relatively low output e.g. for the drive of the capstan shaft of a portable cassette tape recorder apparatus.

Another typical example of such a motor is described in U.S. Pat. No. 4,629,920, the principle of design and of functioning of such motor being incorporated by reference in the present application.

In flat or disc motors where the permanent magnets is fastened to the rotor, such as in U.S. Pat. No. 4,629,920, it is difficult to fasten the magnets because the contact surface of the magnets and of the rotor is very small due to disc geometry. This is not a problem if the motor speed is relatively low, or if the inertia (volume) of the magnets is relatively low, since in these cases the centrifugal force of the magnets can be countered by epoxy resins in the magnet adhesive. However, in cases where high speeds are required, the problem arises of making sure that the magnet is not displaced by centrifugal force created by the rotation of the rotor.

To ensure that this does not happen, a solution of the prior art proposes to use a band with the same diameter as the magnet. Clearly, this band must be made of a relatively elastic material so that it can handle the expansion and contraction of the magnets in working conditions without having to use mechanical tensions that can damage the magnets. At the same time, the band cannot give in to the radial centrifugal force of the magnets, since this force is integral to the magnet's role in the motor.

However, it appears that when the centrifugal force increases (either because of motor speed, or the magnet's shift to a higher work diameter or because the volume increases) the band can stretch to the point of breaking, leaving the magnets free of their fastening at the bottom of the rotor. As the centrifugal force will continue as long as the motor continues its rotation, the magnets (having lost part of their fastening) will detach from the rotor. As the band blocks a radial exit, the magnets usually come out axially, in other words, the magnets pivot upwards from the band. This situation is schematically represented in FIG. 1.

To avoid this axial displacement, there are several existing solutions, such as thin fibreglass discs with epoxy resins. These solutions can be effective, but they also increase the air gap between the magnet and the metal sheet. This means that the magnetic force of the magnet is decreased, and consequently the torque obtained by the motor is decreased. To compensate for this decrease a larger magnet is required, which will also increase its inertia and centrifugal force, and therefore, its axial force. Thus, a vicious circle begins that, in the end, results in a compromised solution including all of these variables.

An aim of the present invention is to improve the known systems.

More specifically, it is an aim of the present invention to provide a motor with improved characteristics.

Another aim of the present invention lies in the optimal efficiency of these motor types as far as their reduction of volume and in the quantity of raw material required for a determined torque.

Accordingly, the present invention is directed to a system for securing permanent magnets to the rotor in flat brushless electric motors (axial flux), although the principle of the invention is also extendable to radial flux motors.

The alternating-current-synchronous-servomotor according to the present invention is defined by the characterizing portion of claim 1. various embodiments are defined in the dependent claims.

The invention will be best understood with the description of several embodiments and the accompanying drawings in which FIG. 1 illustrates an axial section through a prior art servomotor as taught in U.S. Pat. No. 4,629,920;

FIG. 2 discloses a part of the rotor of the servomotor according to FIG. 1 viewed in the direction of the axis, whereby the cover plate facing the viewer is partly broken away;

Taking as reference U.S. Pat. No. 4,629,920 and FIG. 1, the proposed geometry of this prior art suggested modifying the rotor shape. In said patent, the magnets are held by means of an exterior band 32 as protection from centrifugal forces, and with a plate 33 of non-magnetic material for the axial forces. Although this configuration is efficient, the evolution of mechanized magnets experimented with in recent years permits ideas for new fixation systems for the axial forces.

Figure 1:
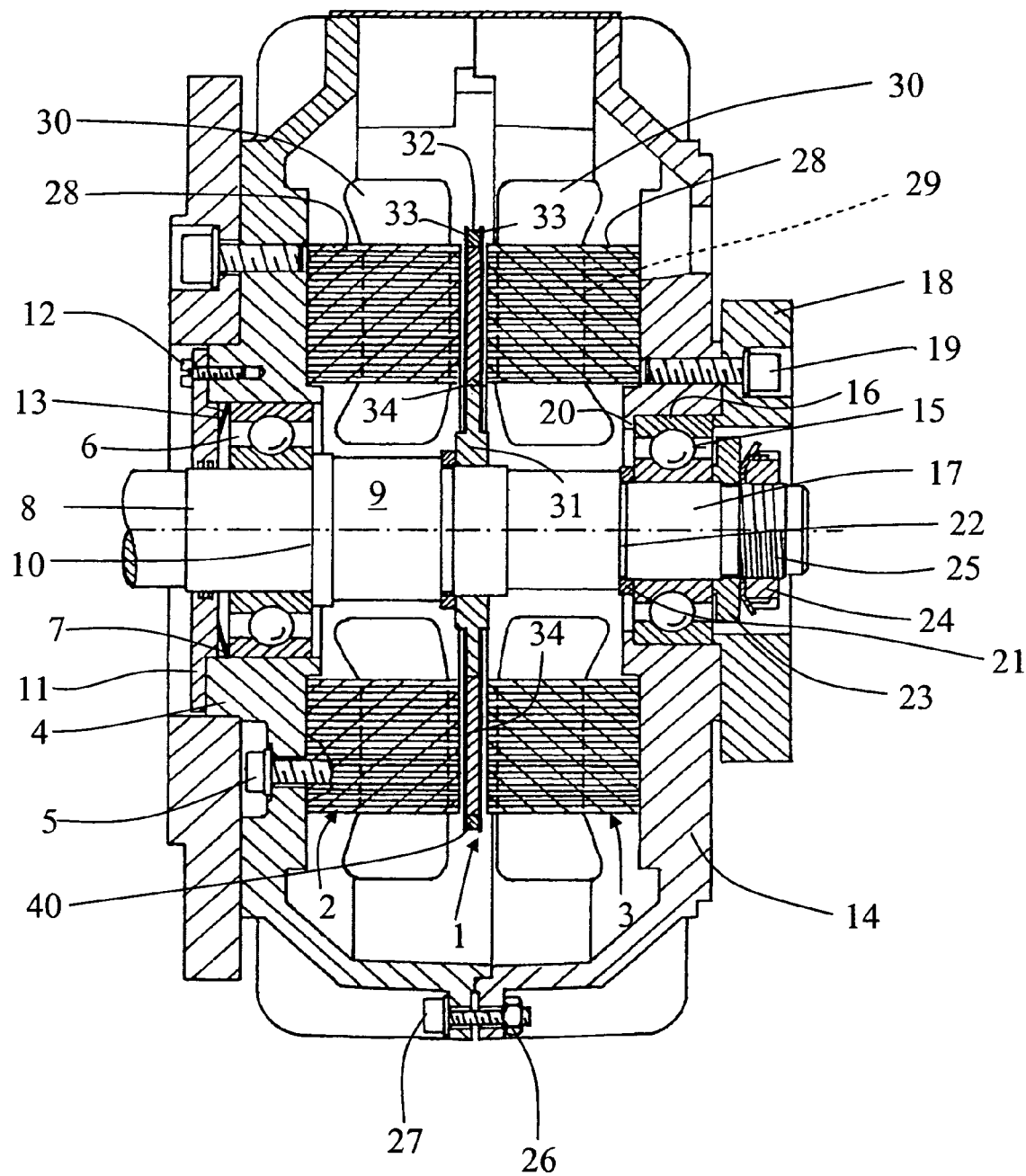

More specifically, this alternating current synchronous servomotor illustrated in FIG. 1 comprises a disk-shaped rotor 1 and two stator halves 2 and 3 between which the rotor 1 is located. The end of the one stator half 2 facing away from the rotor 1 is supported on a casing part 4 and mounted by the agency of screw bolts 5 of which one only can be seen. The outer race of a ball bearing 6 sits in a bore 7 of the casing part 4 while the inner race of this ball bearing sits on an end portion 8 of reduced diameter of the shaft 9 supporting the rotor 1 and rests against a shoulder 10 of this shaft. An annular disk 11 is mounted to the outer side of the casing portion 4 by means of screw bolts 12.

An annular disk spring 13 is arranged between this annular disk 11 and the outer race of the ball bearing 6.

The axial end of the other stator half 3 facing away from the rotor 1 is supported on a casing part 14 and mounted on the casing part 14 by screw bolts (not illustrated). The outer race of a second ball bearing 15 sits in a bore 16 of the casing part 14. The inner race of this ball bearing 15 sits on an end section 17 of reduced diameter of a shaft 9 supporting the rotor. An annular disk 18 is mounted to the casing portion by means of screw bolts 19. The outer race of the ball bearing 15 is pressed by this annular disk 18 against a shoulder 20 on the casing part 14 and accordingly arrested against a displacement in axial direction. A thrust transmitting ring 21 is inserted between the inner race of the ball bearing and a shoulder 22 of the shaft 9. A further thrust transmitting ring 23 is located at the opposite side of the ball bearing 15, which is pressed by means of a nut 24 against the inner race of the ball bearing 15. The nut 24 is screwed on a threaded part 25 of shaft 9.

The two casing parts 4 and 14 which enclose together the rotor 1 and the two stator halves 2 and 3 are interconnected by means of screw bolts 26 and nuts 27 of which only one each is illustrated in FIG. 1.

Each of the stator halves 2 and 3 comprises a ring-shaped magnet iron part 28 which is suitably wound from a web material. A plurality of radial grooves 29 which are open against the rotor 1 are arranged in each magnet iron part 28, of which every one extends from the inner circumferential edge to the outer circumferential edge of the magnet-iron part. The leads of an electric coil 30 are inserted in the radial grooves 29 of each magnet iron part 28. The coils 30 of the two stator halves 2 and 3 are interconnected electrically.

The rotor 1 comprises a hub 31 mounted rigidly on the shaft 9 and having an annular shape and a small axial dimension relative to its outer diameter. The hub 31 is made of a magnetically non-conductive material, e.g. of a Cr—Ni-Steel or Titanium.

Figure 2:
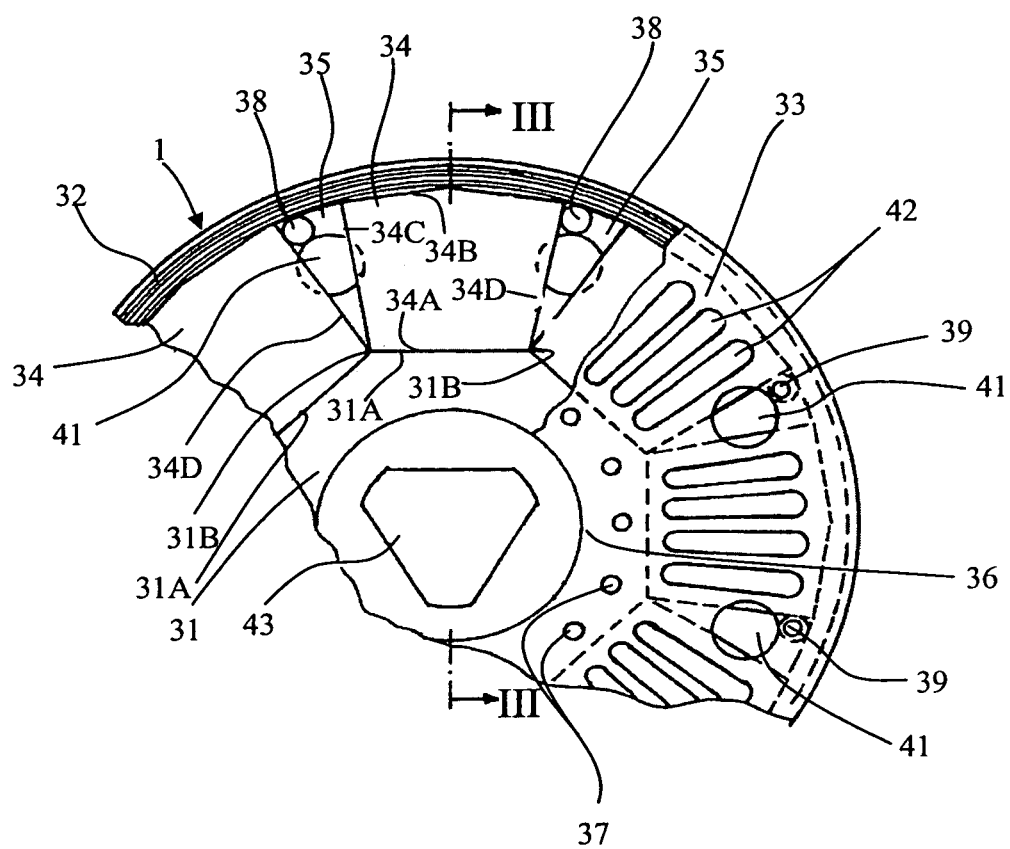

According to FIG. 2, the outer periphery of the hub 31 is formed by flat planes 31A which extend along the sides of a regular polygon having an even number of corners. In the illustrated embodiment the outer periphery of the hub 31 comprises eight flat planes 31A and the same number of intermediate corners 31B. On each of the flat peripheral planes 31A of the hub 31 there is supported a flat limiting plane 34A of a permanent magnet part 34 and mounted by means of a bonding agent, e.g. a two-component bonding means. The permanent magnet pieces 34 are flat plates having roughly a trapezoidal shape such as clearly viewable in FIG. 2. The radially outer limiting plane 34B of every permanent magnet piece is either bent roof-top like, such as illustrated in FIG. 2 or bulged along a circular line extending around the axis of the rotor 1.

Interstices 35 are freely left between permanent magnet pieces 34 following each other in an annular serial arrangement. Preferably, the permanent magnet pieces 34 are made of a rare earth material and magnetized laterally, such that the magnet field lines extend perpendicularly to the roughly trapezoidal flat sides of each permanent magnet piece which act as pole surfaces N and S and thus extend parallel to the axis of the shaft 9. The adjoining permanent magnet pieces 34 are oppositely magnetized such that at each side of the rotor 1 magnetic north and south poles succeed each other. Preferably, all permanent magnet pieces 34 are produced with a same shape and size and magnetized unidirectionally prior to be mounted on the hub 31 in alternatively by 180° changed orientation.

The adjoining permanent magnet pieces 34 comprise limiting surfaces 34C and 34D facing each other, between which a respective one of the previously mentioned interstices 35 is present. Two respective facing limiting surfaces 34C and 34D of the adjoining permanent magnet pieces 34 contact each other at a location where an edge 31B of the hub 31 is located.

From the point of contact the facing limiting surfaces 34C and 34D diverge against the outer circumference of the rotor 1 such that each of the interstices 35 between adjoining permanent magnet pieces 34 has a wedge-like shape such as clearly can be seen as shown in FIG. 2.

The flat sides of all permanent magnet pieces 34 extending in two parallel planes are coated by two parallel, annular shaped cover disks 33 of a magnetically non-conductive material, e.g. a Cr—Ni-Steel or Titanium and bonded to these cover plates by a bonding agent, e.g. a two-component bonding agent. The inner circumferential edge part 36 of each cover plate grips around the hub 31 and is mounted thereto by spot welds 37. Close to the outer circumference of the cover plates 33 an axial distance piece 38 is located in each interstice 35 between the two cover plates and connected to latter by spot welds 39. The outer circumferential edge part of each cover plate 33 extends in radial direction beyond the outer limiting surfaces 34B of the permanent magnet pieces 34 such that a peripheral channel 40 is formed thereat. An elastic bandage 32 made of a magnetically non-conductive material, preferably a glass-fibre material is located in the peripheral channel 40 and is enveloping the permanent magnet pieces 34. The object of the bandage 33 is to securely have the permanent magnet pieces 34 with their radially inner limiting surfaces 34A also at high rotational speeds abutting the planar peripheral sides 31A of the hub 31 and accordingly to lock the permanent magnet pieces 34 in a form-locked manner rotationally rigid with the hub 31 in order to have a safe transmittal at the mechanical torques from the permanent magnet pieces on to the hub.

The two cover plates 33 are provided with a plurality of openings 41 which are aligned with the interstices 35 between the permanent magnet pieces 34. These openings 41 and the interstices 35 form windows at the rotor 1 into which if necessary pieces of material for balancing the rotor 1 can be inserted or bonded thereto by means of a bonding agent. If the cover plates 33 consist, as mentioned, of a metallic material they are suitably provided with additional, e.g. slot like openings 42 which aid for damping eddy currents in the cover plates and additionally aid in reducing the mass of the rotor 1.

If measured in direction of the axis of rotation of the rotor 1 the thickness of the cover plates 33 is small relatively to the thickness of the permanent magnet pieces 34 measured in the same direction, which thickness is in turn little if compared with the outer diameter of the rotor 1. If the outer diameter of the rotor amounts to e.g. about 130 mm the thickness of the permanent magnet pieces 34 if measured in axial direction amounts to e.g. 3.2 to 4.0 mm, and whereby the thickness of each cover plate 33 amounts to e.g. 0.2 to 0.3 mm. It is obvious that such a rotor, which in addition comprises no specific heavier ferromagnetic material at all, has a relatively low mass and accordingly is burdened with a corresponding low inertia of mass. Therefore, the rotor can be accelerated and decelerated relatively fast due to the travelling magnet fields generated in the stator halves 2 and 3 by the coils 30, such that between the momentaneous magnetic fields of the stator halves 2 and 3 at the one hand and the respectively corresponding rotational position of the rotor 1 a small time delay is present. In other words: the described rotor 1 is in a position to adjust specifically speedily its rotational movements to changes in frequency of the alternating current feeding the stator coils 34.

The two cover plates 33 and the bandage 32 produce not only a increased mechanical rigidity of the rotor 1, but act additionally as protection of the relatively easily damageable rare earth-permanent magnet pieces 34 by foreign bodies which can penetrate in between the air gap between the rotor 1 and the magnet iron parts 28 of the stator halves 2 and 3.

The hub 31 of the rotor 1 is suitably placed on a non-circular section 31 of the shaft 9 and is provided to this end with central opening 43 which is shaped correspondingly to the cross-section of the shaft section 31. It is, however, also possible to design the shaft section 31 and the opening 43 circularly and to mount the hub 31 to the shaft section 31 by means of a press-fit.

Figure 3:
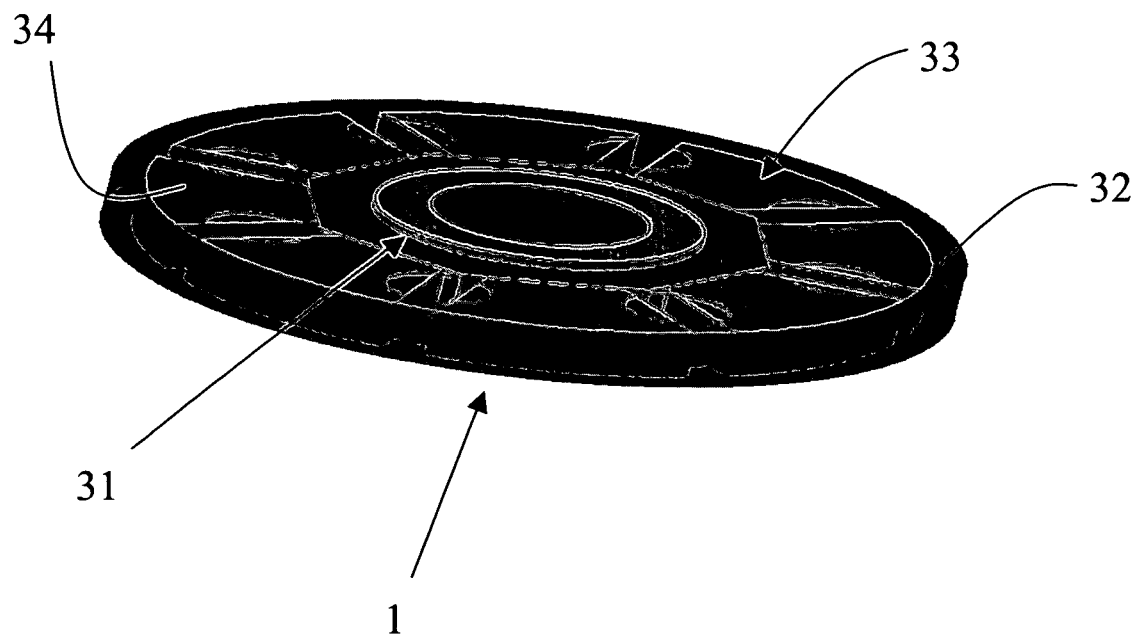
FIG. 3 shows schematically another view of the solution according to the prior art.

In the shape of axial flux motors of the prior art as schematically represented in FIGS. 1 to 3, the magnets 34 have a small flat contact surface 34A with the hub 31 that forms the rotor 1. Gluing this small magnet surface 34A to the hub 31 may not be sufficient for the centrifugal forces to which the magnet 34 may be subjected when working at high speeds. For this reason it is necessary to attach the band 32 to the rotor 1 at the same time as an axial fixative, to avoid the attraction of the magnet 34 to the stators.

In principle, the thickness of the band 32 does not present any problem, given that diametrically there is available space that is not relevant for the performance of the motor. However, the distance that exists between the magnet and the stator has a great influence. This thickness is interesting from the magnetical point of view, since not having the smallest value possible increases the magnetic air gap and requires more magnetic volume to channel the same flux lines towards the coils that form the stator. Then the fixation that is done on the magnets through the band 32 increases the magnetic air gap, making the system less efficient.

The focus of this invention is to reduce or even avoid this axial reinforcement, and that the magnet itself tolerates the strength to which it is axially subjected to.

Figure 4:
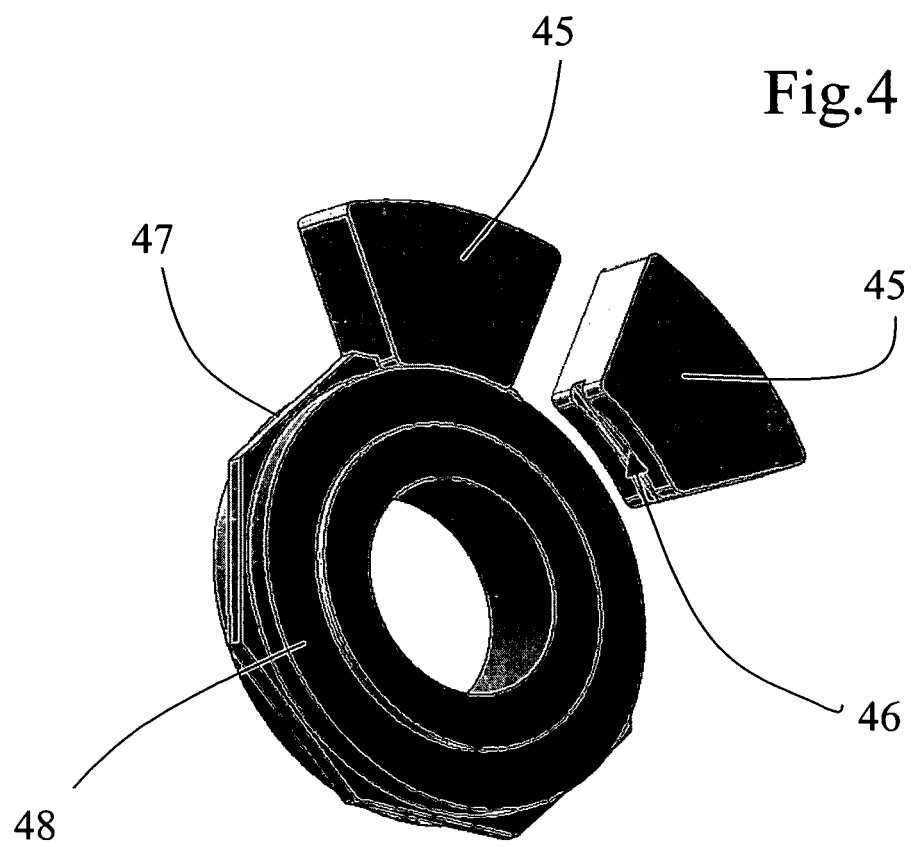
FIG. 4 shows schematically a first embodiment of the invention.

A first embodiment of the system according to the invention is the one represented in FIG. 4. Each magnet 45, which corresponds to the magnets 34 described in connection with FIGS. 1 to 3, has a small straight canal 46 in the shape of a slot that aligns with a regular polygon (in this case an octagon) that is formed by flat planes 47 and on the outer periphery of the hub 48, which corresponds to the hub 31 described above. These flat planes 47 anchor the magnets 45 from possible slipping (in a similar manner to a key) by being inserted into the canals 46, in the case that the magnet 45 rests in a cylindrical surface. In this embodiment, the canals 46 cooperating with the planes 47 maintain the magnets 45 axially.

In this embodiment, a band identical to band 32 (see FIGS. 1 to 3) is needed, in order to hold back the magnets 45 from the centrifugal forces.

The objective was to maintain the same magnet volume so that the cost is the same but not needing the axial fastening, i.e. the plates 33 of FIGS. 1 to 3, the magnetic air gap is reduced and, as a consequence, the torque of the motor will be greater.

Figure 5:
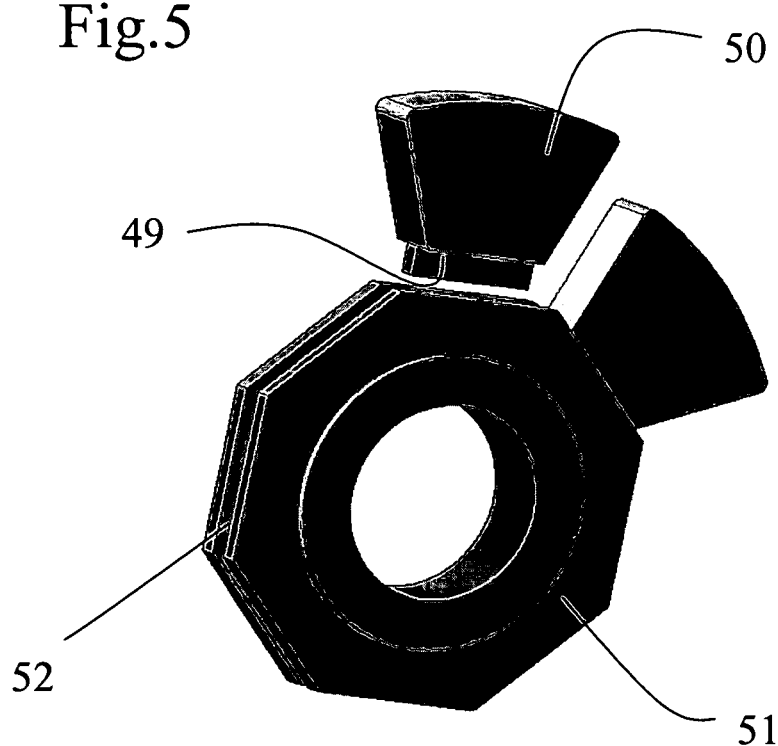
FIG. 5 shows schematically a variant of the first embodiment of the invention.

A similar system can be inversed, which is the variant represented in FIG. 5: In this case, the flat plane 49 protrudes from the magnet 50 instead of from the hub 51. Accordingly, a protruding flat plane 49 in the bottom part of the magnet 50 would be introduced into a canal 52 as a guide in order to counterbalance axial forces on the magnets 50. In this embodiment, a band 32 (as represented in FIGS. 1 to 3) would also be required to avoid slipping of the magnets 50, detached by the centrifugal forces of the rotation.

In this first embodiment and its variant, it is of course possible to add a gluing material when mounting the magnets onto the hub.

Figure 6:
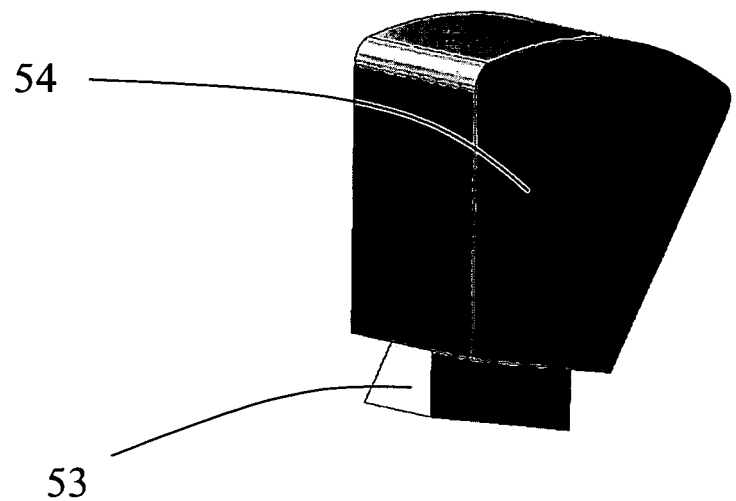
FIG. 6 shows a second embodiment of the invention.

In a second embodiment, the means for fastening the magnets to the hub could be designed not only as a containment of the axial forces, but also of the centrifugal forces. In this embodiment, represented in FIG. 6, the proposed geometry has the shape of a dovetail part 53 on the magnet 54 which is inserted into a corresponding groove or slot in the hub. The mounting of such magnets 54, however, would require that the hub be formed in preferably two parts, as will a skilled person understand.

The main advantage of this embodiment is that now a band around the rotor is not necessary anymore, thus reducing the manufacturing time of the rotor and consequently the cost as well.

Of course, as for the first embodiment disclosed above, this second embodiment could have a variant in which the dovetail part is placed on the hub rather than on the magnet pieces, in this case the magnet pieces comprise a corresponding groove or slot for insertion of said dovetail part.

Figure 7:
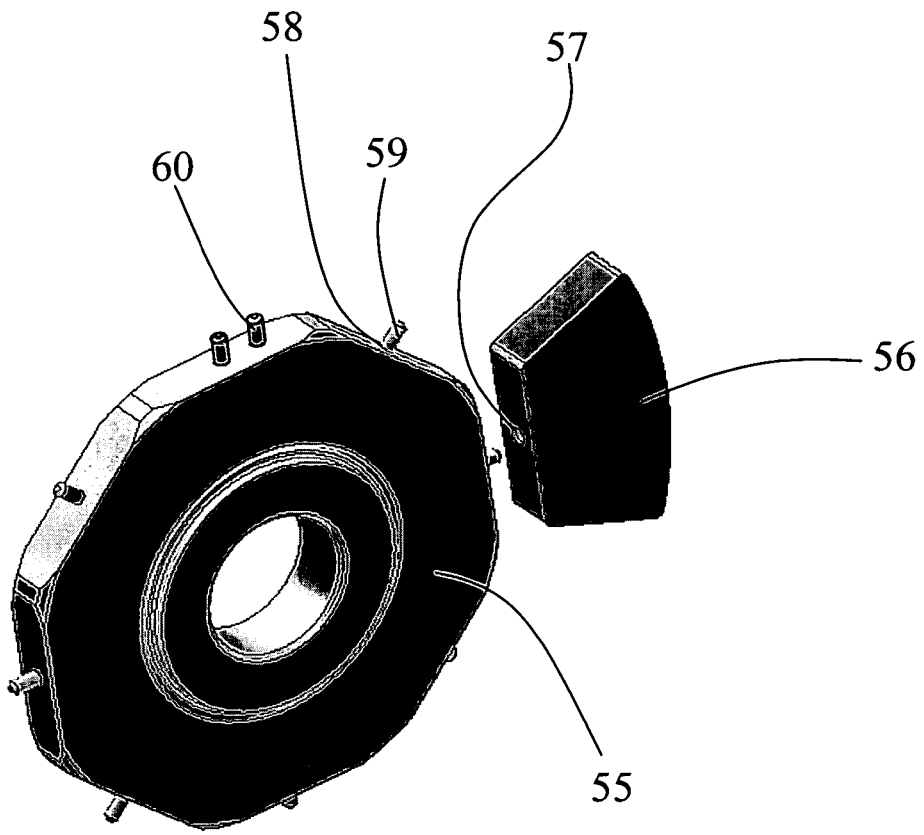
FIG. 7 shows a third embodiment of the invention.

In a third embodiment shown in FIG. 7, the idea is to drill at least a hole 58 in the hub 55 and a corresponding hole 57 in the magnets 56 and then to add a bolt 59 to anchor the magnet 56 against the hub 55. When using a bolt 59, there is no need to use an adhesive so time is saved during the construction operations.

In addition to a bolt 59, one could add at least one pin 60 or another bolt situated next and parallel to the bolt 59 to prevent a rotation of the magnet 56 around the bolt 59.

Instead of the bolts 59 or pins 60 setscrews are preferably used. Setscrew is a screw without head and a special key (Allen key) fitting in the aim of the body is used to tighten it.

The pins or setscrews are fixed by mechanical interference so it is necessary to drill a hole and make up a thread as for the bolts.

The invention claimed is:

1. Alternating-current-synchronous-servomotor having a disk-shaped rotor which is located between two stator halves of which each is provided with a bearing for a shaft supporting the rotor and comprise each a magnet iron part having a plurality of radial grooves and an electrical coil having leads inserted in the radial grooves, which rotor comprises an even number of flat permanent magnets pieces having magnet field lines extending parallel to the shaft, which permanent magnet pieces form an annular like series including interstices extending around a hub supported on the shaft and of a magnetically non-conductive material and have flat sides acting as magnetic pole surfaces (N, S) which extend in parallel planes to which the axis of the shaft extend perpendicularly and are serially alternating north and south poles, and whereby the interstices between adjacent permanent magnet pieces diverge radially towards the outside, the outer periphery of the hub comprising planes extending along the sides of a regular polygon and edges located therebetween, and the permanent magnet pieces have limiting surfaces located radially inwards, which are supported each on one of the peripheral planes of the hub, wherein said planes and said limiting surfaces comprise cooperating means extending in a plane perpendicular to said peripheral planes, said cooperating means for fixing said magnet pieces on said hub, wherein said cooperating means engage said magnet pieces against the hub in a plane perpendicular to said peripheral planes.

2. A servomotor as defined in claim 1, wherein said cooperating means comprise flat planes and corresponding grooves.

3. A servomotor as defined in claim 2, wherein said flat planes are on the hub and said grooves are on the magnet pieces.

4. A servomotor as defined in claim 2, wherein said flat planes are on the magnet pieces and said grooves are on the hub.

5. A servomotor as defined in claim 1, wherein said cooperating means comprise bolts for screwing together the hub and the magnet pieces.

6. A servomotor as defined in claim 5, wherein it further comprises pins for blocking the magnet pieces against rotation.

7. A servomotor as defined in claim 1, wherein said cooperating means comprise setscrews for screwing together the hub and the magnet pieces.

8. A servomotor as defined in claim 1, wherein it further comprises a band placed around the rotor.

9. A servomotor as defined in claim 1, wherein said cooperating means comprise a dovetail part on the magnet pieces inserted into a corresponding groove or slot in the hub.

10. A servomotor as defined in claim 1, wherein said cooperating means comprise a dovetail part hub inserted into a corresponding groove or slot in the magnet pieces.

* * * * *